US012567668B2

(12) United States Patent
Wong et al.

(10) Patent No.: US 12,567,668 B2
(45) Date of Patent: Mar. 3, 2026

(54) ULTRA-BROADBAND LOOP ANTENNA FOR WIRELESS COMMUNICATION AND ENERGY TRANSCEIVER

(71) Applicant: City University of Hong Kong, Kowloon (HK)

(72) Inventors: Hang Wong, Kowloon (HK); Bing Xiao, Kowloon (HK)

(73) Assignee: City University of Hong Kong, Kowloon (HK)

( * ) Notice: Subject to any disclaimer, the term of this patent is extended or adjusted under 35 U.S.C. 154(b) by 175 days.

(21) Appl. No.: 18/409,986

(22) Filed: Jan. 11, 2024

(65) Prior Publication Data

US 2025/0233308 A1 Jul. 17, 2025

(51) Int. Cl.
*H01Q 7/00* (2006.01)
*H04B 5/22* (2024.01)

(52) U.S. Cl.
CPC ................ *H01Q 7/00* (2013.01); *H04B 5/22* (2024.01)

(58) Field of Classification Search
CPC .................................... H01Q 7/00; H04B 5/22
See application file for complete search history.

(56) References Cited

U.S. PATENT DOCUMENTS

| 8,270,914 | B2 | 9/2012 | Pascolini et al. | |
| 11,205,837 | B2 | 12/2021 | Zhu et al. | |
| 2009/0121944 | A1* | 5/2009 | Sotoudeh | H01Q 9/42 |
| | | | | 343/702 |
| 2013/0135173 | A1* | 5/2013 | Ridgeway | H01P 11/00 |
| | | | | 29/601 |

OTHER PUBLICATIONS

Rowell, Corbett, and Edmund Y. Lam. "Mobile-phone antenna design." IEEE Antennas and Propagation Magazine 54.4 (2012): 14-34.
Wong, Hang, et al. "Small antennas in wireless communications." Proceedings of the IEEE 100.7 (2012): 2109-2121.
Zhang, Zhijun. Antenna design for mobile devices. John Wiley & Sons, 2017.
Xiao, Bing, et al. "Design of small multiband full-screen smartwatch antenna for IoT applications." IEEE Internet of Things Journal 8.24 (2021): 17724-17733.
Xiao, Bing, Hang Wong, and Kwan L. Yeung. "Penta-band dual-fed smart glasses IoT antenna." 2020 14th European Conference on Antennas and Propagation (EuCAP). IEEE, 2020.
(Continued)

*Primary Examiner* — Daniel D Chang
(74) *Attorney, Agent, or Firm* — Renner, Kenner, Greive, Bobak, Taylor & Weber

(57) ABSTRACT

A loop antenna, which contains a loop portion that extends along a virtual closed shape. The loop portion is opened-ended and have two ends that are separated by a gap. The loop antenna further includes a first equivalent capacitive coupling element (eCCE) that is at least partially adjacent to the gap. The first eCCE is connected to the loop portion near the gap. The loop antenna supports functionalities of mobile electronic devices in wireless communication and wireless energy transceiving in multiple or ultra-broad frequency bands.

13 Claims, 3 Drawing Sheets

(56)        References Cited

OTHER PUBLICATIONS

D. Wu, S. W. Cheung, and T. I. Yuk, "A Compact and Low-Profile Loop Antenna With Multiband Operation for Ultra-Thin Smartphones," IEEE Transactions on Antennas and Propagation, vol. 63, No. 6, pp. 2745-2750, Jun. 2015, doi: 10.1109/TAP.2015.2412962.
H. Xu et al., "A Compact and Low-Profile Loop Antenna With Six Resonant Modes for LTE Smartphone," Ieee T Antenn Propag, vol. 64, No. 9, pp. 3743-3751, Sep. 2016, doi: 10.1109/TAP.2016. 2582919.
Xiao, Bing, et al. "Dipole antenna with both odd and even modes excited and tuned." IEEE Transactions on Antennas and Propagation 70.3 (2021): 1643-1652.

* cited by examiner

ULTRA-BROADBAND LOOP ANTENNA FOR WIRELESS COMMUNICATION AND ENERGY TRANSCEIVER

FIELD OF INVENTION

This invention relates to radio frequency antennas of mobile electronic devices, and in particular to loop antennas for mobile electronic devices.

BACKGROUND OF INVENTION

Mobile electronic devices are widely used in industry and personal life, and a lot of these devices have the capability of wireless communication and/or wireless energy transceivers. Examples of these mobile electronic devices include smartphones, smartwatches/wristbands, smart glasses, unmanned aerial vehicles (UAVs), Internet of Things (IoT) devices, and hybrid devices with the functionalities of multiple devices of these types. For devices with wireless communications and/or wireless energy-transceiving capabilities, their radio frequency modules usually cover one or more frequency bands in the sub-6 GHz spectrum (~700 MHz-6 GHz), because this spectrum includes carrier frequency bands of 2G, 3G, 4G, and sub-6 GHz-5G, together with some frequency bands for industrial, scientific, and medical (ISM), global navigation satellite system (GNSS), IoT, and other communication protocols.

To satisfy the diversified demands of consumers, mobile electronic device manufacturers always strive to implement radio frequency components, such as antennas, to be able to cover the frequency bands as wide as possible. On the other hand, unlike other antennas, an antenna for mobile electronic devices (mobile antenna) should have a quite small size, i.e., a small projected area and extremely low profile.

However, there is a contradiction between the reserved limited space and the required ultra-broad frequency band. It results from the rule of quality factor, a fundamental rule in electromagnetics. This fact severely limits the performance of mobile antennas. Thus, many people have focused on this problem, and they design complicated antenna geometries and adopt high-performance antenna tuners to cover frequency bands as broad as possible. However, existing antennas can only cover limited segments of the spectrum mentioned above, and are still quite far from covering the whole Sub-6 GHz spectrum. For example, iPhone® 14 Pro Max contains several antennas which are cooperated with several antenna tuners, to cover frequency bands of 600-900 MHz/1500 MHz/1800-2600 MHZ/3500-3900 MHz/4700 MHz for the cellular network. Apple Watch® Series 8 antennas cover 700-850 MHz/1800-2600 MHz for the cellular network. Additionally, mobile device antennas commonly can only achieve a lower standard of reflection coefficient, compared with base station antennas. The former is <−6 dB (corresponding to a minimum total efficiency of 75%), while the latter is at least <−10 dB (corresponding to a minimum total efficiency of at least 90%).

SUMMARY OF INVENTION

In view of the above-mentioned problems, one of the targets this invention endeavors to solve is to alleviate the contradiction by proposing a small loop antenna for mobile electronic devices covering the whole Sub-6 GHz frequency band.

Accordingly, in one aspect the invention provides a loop antenna, which contains a loop portion that extends along a virtual closed shape. The loop portion is opened-ended and have two ends that are separated by a gap. The loop antenna further includes a first equivalent capacitive coupling element (eCCE) that is at least partially adjacent to the gap. The first eCCE is connected to the loop portion near the gap.

In some embodiments, both the loop portion and the first eCCE are electrically conductive strips and each of them has a surface. The surfaces of the loop portion and the first eCCE are parallel to each other.

In some embodiments, the surfaces of the loop portion and the first eCCE are located substantially in a same virtual plane as the virtual closed shape.

In some embodiments, the surfaces of the loop portion and the first eCCE are substantially perpendicular to a virtual plane in which the virtual closed shape is located.

In some embodiments, the virtual closed shape is a round shape. The loop portion has a shape of an annular sector.

In some embodiments, the first eCCE is located at one of a radially inward position and a radially outward position of the loop portion.

In some embodiments, the loop antenna further includes a second eCCE. The second eCCE is located at the other one of the radially inward position and the radially outward position of the loop portion.

In some embodiments, the second eCCE and the first eCCE have different lengths in their circumferential directions.

In some embodiments, both the second eCCE and the first eCCE are connected to the loop portion near the gap.

In some embodiments, the first eCCE is connected to the loop portion at a middle point of the first eCCE.

In some embodiments, the loop antenna is fed at one or both of the two ends of the loop portion.

In some embodiments, the loop antenna further includes a connecting line that electrically connects the loop portion and the first eCCE. The connecting line passes near the gap.

In some embodiments, the first eCCE includes a first portion and a second portion delimited by a joint of the first connecting line and the first eCCE. The loop antenna further contains a second connecting line that electrically connects the loop portion and the second eCCE. The second eCCE includes a first portion and a second portion delimited by a joint of the second connecting line and the second eCCE. The first portions of the first eCCE and the second eCCE have different lengths in their circumferential directions, and the second portions of the first eCCE and the second eCCE have different lengths in their circumferential directions.

In some embodiments, the loop portion and the first eCCE are substantially parallel to each other along their directions of extension, such that a spacing between the first eCCE and the loop portion is substantially unchanged.

In some embodiments, the loop portion and the second eCCE are substantially parallel to each other along their directions of extension, such that a spacing between the second eCCE and the loop portion is substantially unchanged.

One can see that exemplary embodiments of the invention provide loop antennas that support functionalities of mobile electronic devices in wireless communication and wireless energy transceiving in multiple or ultra-broad frequency bands. Moreover, the loop antennas also benefit ultra-broadband wireless energy harvesting and ultra-broadband sensing. The tedious and particularly careful sub-6 GHz antenna tuning process is no longer required in the R&D process of mobile electronic devices. Most expensive sub-6 GHz antenna tuners are also not required anymore.

The foregoing summary is neither intended to define the invention of the application, which is measured by the claims, nor is it intended to be limiting as to the scope of the invention in any way.

BRIEF DESCRIPTION OF FIGURES

The foregoing and further features of the present invention will be apparent from the following description of embodiments which are provided by way of example only in connection with the accompanying figures, of which.

In the drawings, like numerals indicate like parts throughout the several embodiments described herein.

DETAILED DESCRIPTION

Figure 1:
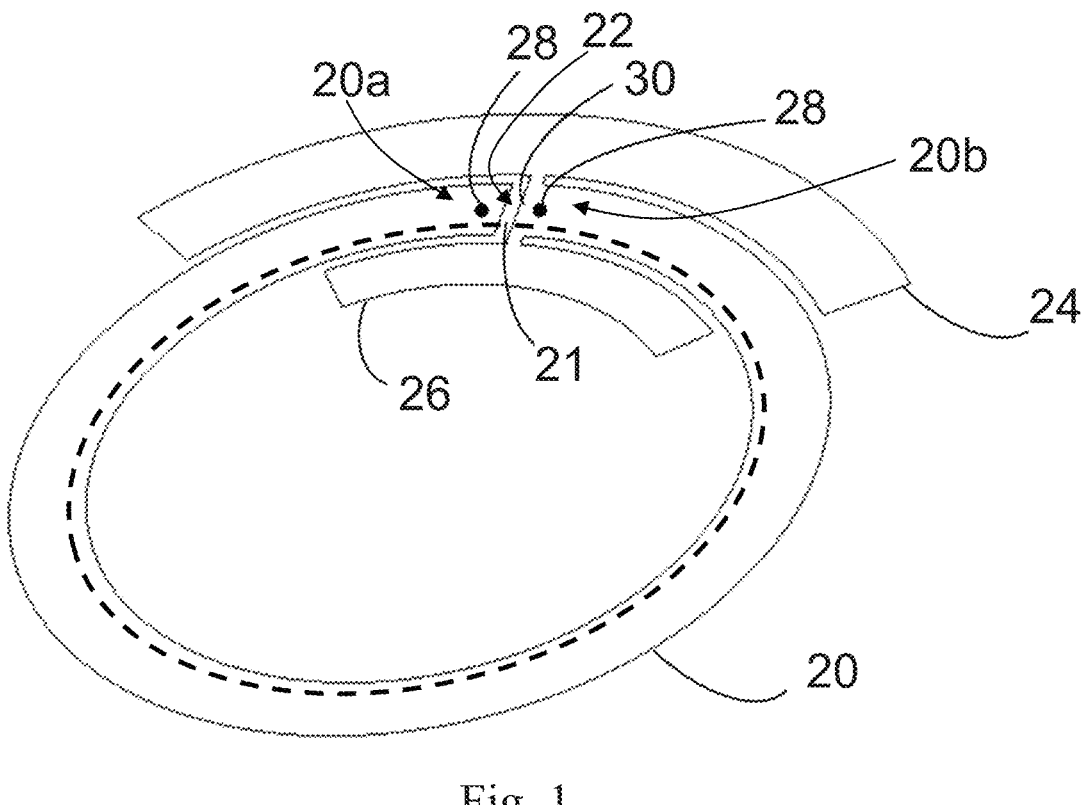
FIG. 1 is a perspective view of a loop antenna according to a first embodiment of the invention.

Referring now to FIG. 1, a first embodiment of the invention is loop antenna which has a planar shape. The loop antenna contains a loop portion 20, which is the main radiator of the loop portion 20 and has an annular sector shape. In other words, the loop portion 20, while extending along a virtual round shape 21 (which is a closed shape), is not actually closed to form a full circle. Rather, the loop portion 20 is open-ended, and contains two ends 20a, 20b which are separated by a gap 22. The loop portion 20 has a uniform width along a circumferential direction, and the width refers to the dimension of the loop portion 20 in the radial direction.

The loop antenna further contains a first eCCE 24 and a second eCCE 26 that are electrically connected to the loop portion 20. The first eCCE 24 and the second eCCE 26 are also referred to as "couplers". Each of the first eCCE 24 and the second eCCE 26 has a curved shape, and their curvatures are the same as the loop portion 20. In other words, hypothetical circles (not shown) which the first eCCE 24 and the second eCCE 26 respectively run along with and pass through, are coaxial with the virtual round shape 21. The lengths of the first eCCE 24 and the second eCCE 26 along the circumferential direction are different, and the first eCCE 24 is longer than the second eCCE 26. The first eCCE 24 is located radially outward of the loop portion 20, and the second eCCE 26 is located radially inward of the loop portion 20. Both the first eCCE 24 and the second eCCE 26 extend along with the loop portion 20, and are entirely adjacent to the loop portion 20. In fact, both the first eCCE 24 and the second eCCE 26 are parallel to the loop portion 20 and to each other along their directions of extension (which are the circumferential direction). Because of the parallel relationship, a spacing between the first eCCE 24 and the loop portion 20 is substantially unchanged along the length of the first eCCE 24. Likewise, a spacing between the second eCCE 26 and the loop portion 20 is substantially unchanged along the length of the second eCCE 26.

In the exemplary embodiment shown in FIG. 1, the loop portion 20, the first eCCE 24 and the second eCCE 26 are formed as a single piece, so they are located in the same plane, and each of the loop portion 20, the first eCCE 24 and the second eCCE 26 is an electrically conductive strip. All the conductive strips are also parallel to a plane of antenna placement, for example a top surface of a PCB (Printed Circuit Board) substrate (not shown). The loop portion 20, the first eCCE 24 and the second eCCE 26 because of their planar shapes each have a top surface and a bottom surface. All the top surfaces and bottom surfaces are parallel to each other, and the top surfaces are flush with each other, so are the bottom surfaces. As the thicknesses of the electrically conductive strips are very small, they may be neglected, such that all top surfaces and bottom surfaces may be deemed as being located within a same virtual plane (not shown) in which the virtual round shape 21 is located.

The conductive traces of the loop antenna may be fabricated using different technologies, for example as microstrips on top of a PCB. However, those skilled in the art should realize that in other variations of the invention, the conductive strips can be Flexible Printed Circuit (FPC), or being part of the mobile electronic device's conductive housing structures, or can be metallic wire structures, etc.

As mentioned above, the first eCCE 24 and the second eCCE 26 are electrically connected to the loop portion 20, and this is achieved by configuring a connecting line 30 which passes through the gap 22. As shown in FIG. 1, each of the first eCCE 24 and the second eCCE 26 forms a T-shaped structure with a corresponding part of the connecting line 30, and this is in contrast to conventional capacitive coupling element (CCE) in which the traces of the coupler and the main radiator are not directly connected. The connecting line 30 thus can be considered as having two segments, each being a separate connecting line for a respective eCCE. In particular, eCCE is derived from CCE, and typically an eCCE is made of an electrically conductive strip or plate, which is an additional topology structure out of an antenna's main radiator. It is near and couples to the antenna's main radiator, having a connecting point near the feeding location of the main radiator. The eCCE is commonly in T-shape or its deformation. It is a coupling structure; thus, it can also be considered a coupler. Its function is to excite the radiator's eigenmodes whose eigencurrent has a magnitude minimum at the connecting point on the antenna's main radiator.

The connecting line 30 is also made as a single piece with the loop portion 20, the first eCCE 24 and the second eCCE 26, and the connecting line 30 extends along a radial direction to connect the loop portion 20, the first eCCE 24 and the second eCCE 26 together at the gap 22. It can be seen that the connecting line 30 connects to the first eCCE 24 at substantially a middle point of the first eCCE 24 along the circumferential direction, and similarly to a middle point of the second eCCE 26 along the circumferential direction. The first eCCE 24 can be considered as having two portions, which are delimited by the joint of the connecting line 30 and the first eCCE 24. In other words, a virtual extension line (not shown) of the connecting line 30 passes through first eCCE 24, and on the left of the virtual extension line there is a first portion of the first eCCE 24, and on the right of the virtual extension line there is a second portion of the first eCCE 24. Similarly, the second eCCE 26 can be considered as having two portions, which are delimited by the joint of the connecting line 30 and the second eCCE 26. A virtual extension line (not shown) of the connecting line 30 passes through second eCCE 26, and on the left of the virtual extension line there is a first portion of the second eCCE 26, and on the right of the virtual extension line there is a second portion of the second eCCE 26. As shown in FIG.

1, the left portion of the first eCCE 24 is longer than the left portion of the second eCCE 26. Likewise, the right portion of the first eCCE 24 is longer than the right portion of the second eCCE 26.

The loop antenna in FIG. 1 is fed at both ends 20a, 20b of the loop portion 20. In other words, the loop antenna is fed in the breakpoint (i.e., the gap 22) of the loop. In particular, there is a feeding terminal 28 configured on each of the two ends 20a, 20b, and the feeding terminals 28 are connected with feedlines (not shown in FIG. 1) that feed the loop antenna from external sources (not shown). The feedlines for example are in the forms of planar striplines within PCB, microstrip lines on PCB, coaxial lines, structural components, or others. The two feedlines may be a positive feedline and a negative feedline respectively. Alternatively, one of the feedlines may be a signal feedline, and the other one is ground.

Having described the structure of the loop antenna, the descriptions will now turn to the working principle of the antenna. A loop (like the loop portion 20) is often used as the antenna of mobile devices, because it can naturally integrate with metallic casings, such as the casings of modern smartphones. However, as a loop itself can only excite single resonance for each mode, conventional loop antenna cannot achieve ultra-broad bandwidth with the reflection coefficient $<-10$ dB. In comparison, the loop antenna in FIG. 1 contains multiple near-feeding-location eCCE that excite inherent multi-order degenerate loop modes to expand the antenna bandwidth significantly. The loop antenna in FIG. 1 excites n orders of modes: $1\lambda$, $2\lambda$, $3\lambda$, $480$ . . . modes, and each mode will have dual resonances, excited by the eCCE and the gap of the feedline respectively. As mentioned above, the feedlines are connected to the feeding terminals 28 on the two ends 20a, 20b of the loop portion 20, in order to feed the loop portion 20 from external sources. The eCCE introduce perturbations, which result in a difference in resonant frequencies of the dual degenerated modes. Thus, the loop antenna in FIG. 1 has 2n resonances. The spacings between resonant frequencies of the 2n resonances are small enough, such that the antenna can achieve ultra-broad bandwidth with a reflection coefficient $<-10$ dB. In fact, the loop antenna of FIG. 1 achieves a reflection coefficient lower than $-10$ dB (corresponding to a total efficiency of higher than 90%) in the entire sub-6 GHz spectrum. The perimeter of the loop is only about one wavelength of the lowest resonant frequency ($1\lambda_{lowest}$). It corresponds to a diameter of about $0.2\lambda_{lowest}$, a small size suitable for the metal frame antenna of smartphones, smartwatches, smart glasses, and many other mobile smart devices.

Figure 2:
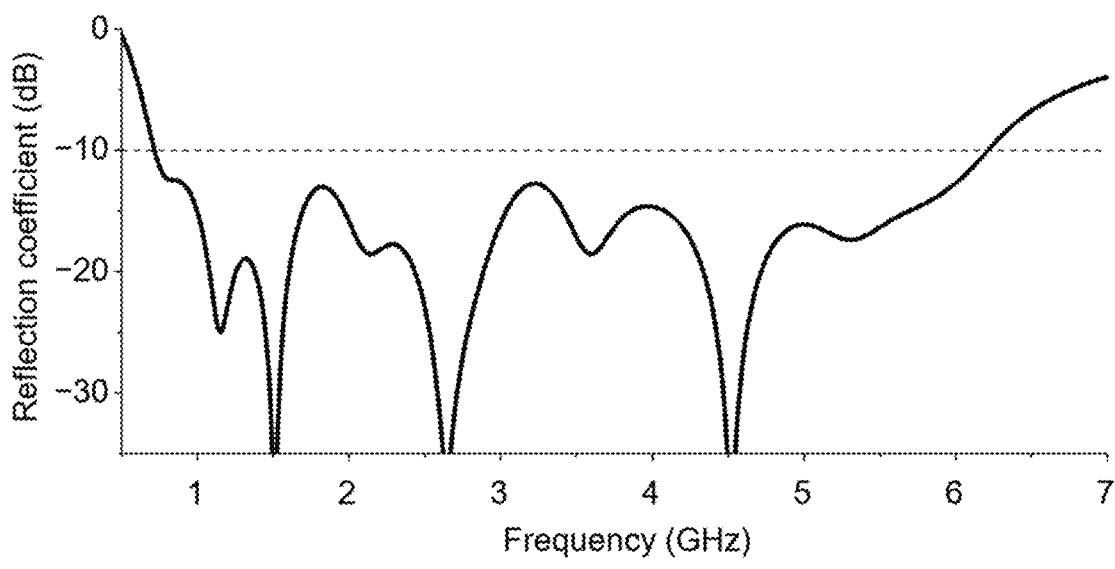
FIG. 2 is a graph showing the reflection coefficient of the loop antenna in FIG. 1 in the frequency domain.
Figure 3:
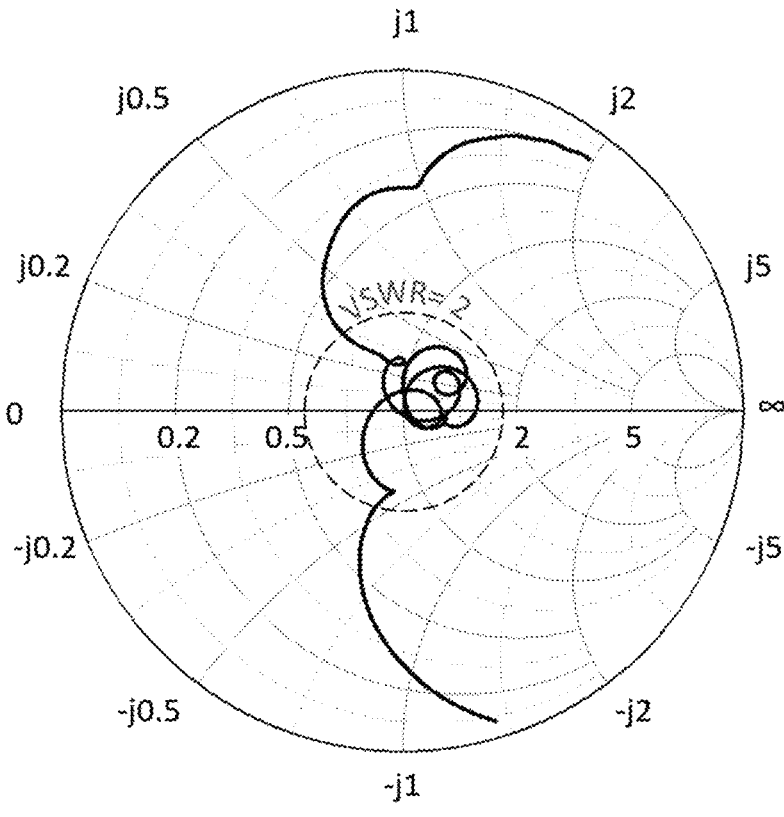
FIG. 3 is a Smith chart showing the impedance matching characteristics of the loop antenna in FIG. 1 in the frequency domain.

The reflection coefficient of the loop antenna of FIG. 1 is shown in FIG. 2. Because each of the two degenerate modes of all the first several nth order resonances of the loop antenna can be excited simultaneously, in total 2n modes of the loop antenna are excited. Therefore, the spacings of the excited modes are very close in the frequency spectrum. In a very broad frequency range, the antenna is well matched to a 50Ω typical radio frequency port, as shown in the Smith chart of FIG. 3. In the illustrative example, the bandwidth is 721 MHz-6197 MHz, achieving a relative bandwidth up to 158%, i.e., 8.6 octaves. This bandwidth is significantly wider than conventional loop antennas.

Figure 4:
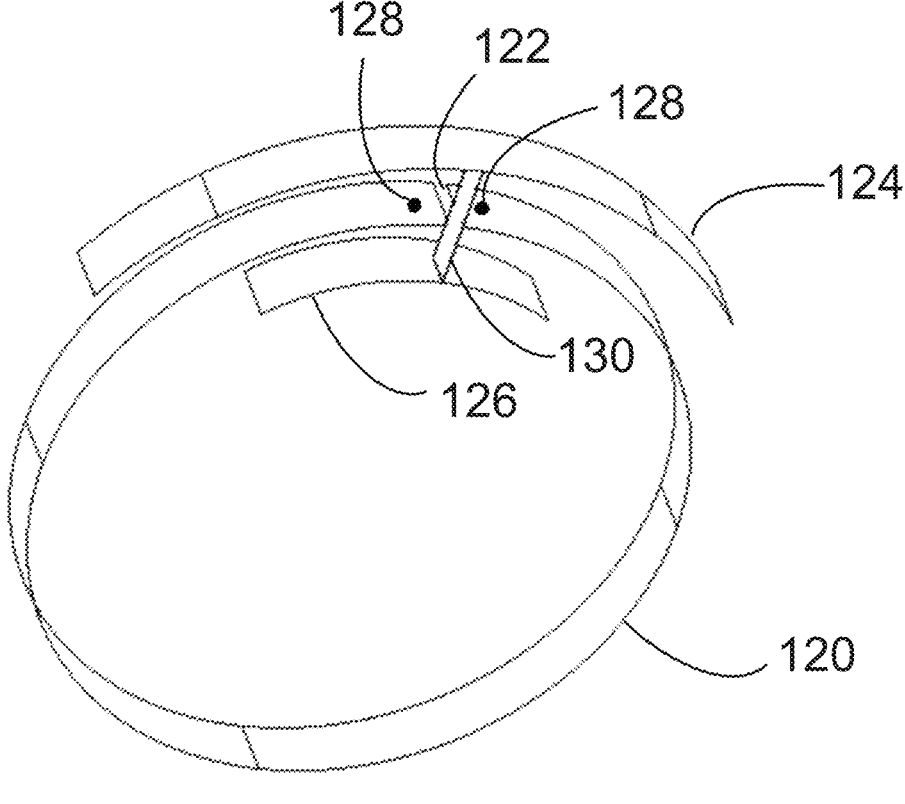
FIG. 4 is a perspective view of a loop antenna according to a second embodiment of the invention.

FIG. 4 shows a loop antenna according to another embodiment of the invention. The structure and components of the loop antenna are generally similar to those in FIG. 1, and they will not be described again for the sake of brevity. Rather, only differences between the loop antenna in FIG. 4 compared to that in FIG. 1 will be described. In particular, the loop portion 120, the first eCCE 124 and the second eCCE 126, and the connecting line 130 are also electrically conductive strips, but their orientations are different compared to their counterparts in FIG. 1. As one can see from FIG. 4, all the top and bottom surfaces of the loop portion 120, the first eCCE 124 and the second eCCE 126, and the connecting line 130 are now substantially perpendicular to a virtual plane in which the virtual closed shape (not shown) is located. As a result, the top and bottom surfaces of the conductive strips are substantially perpendicular to a plane of antenna placement. In addition, one can see that the left portions of the first eCCE 124 and the second eCCE 126 (as delimited generally by the connecting line 130) are not equal in length. Likewise, the right portions of the first eCCE 124 and the second eCCE 126 are also not equal in length. Also, the connecting line 130 is not connected to the second eCCE 126 at a middle point thereof.

Figure 5:
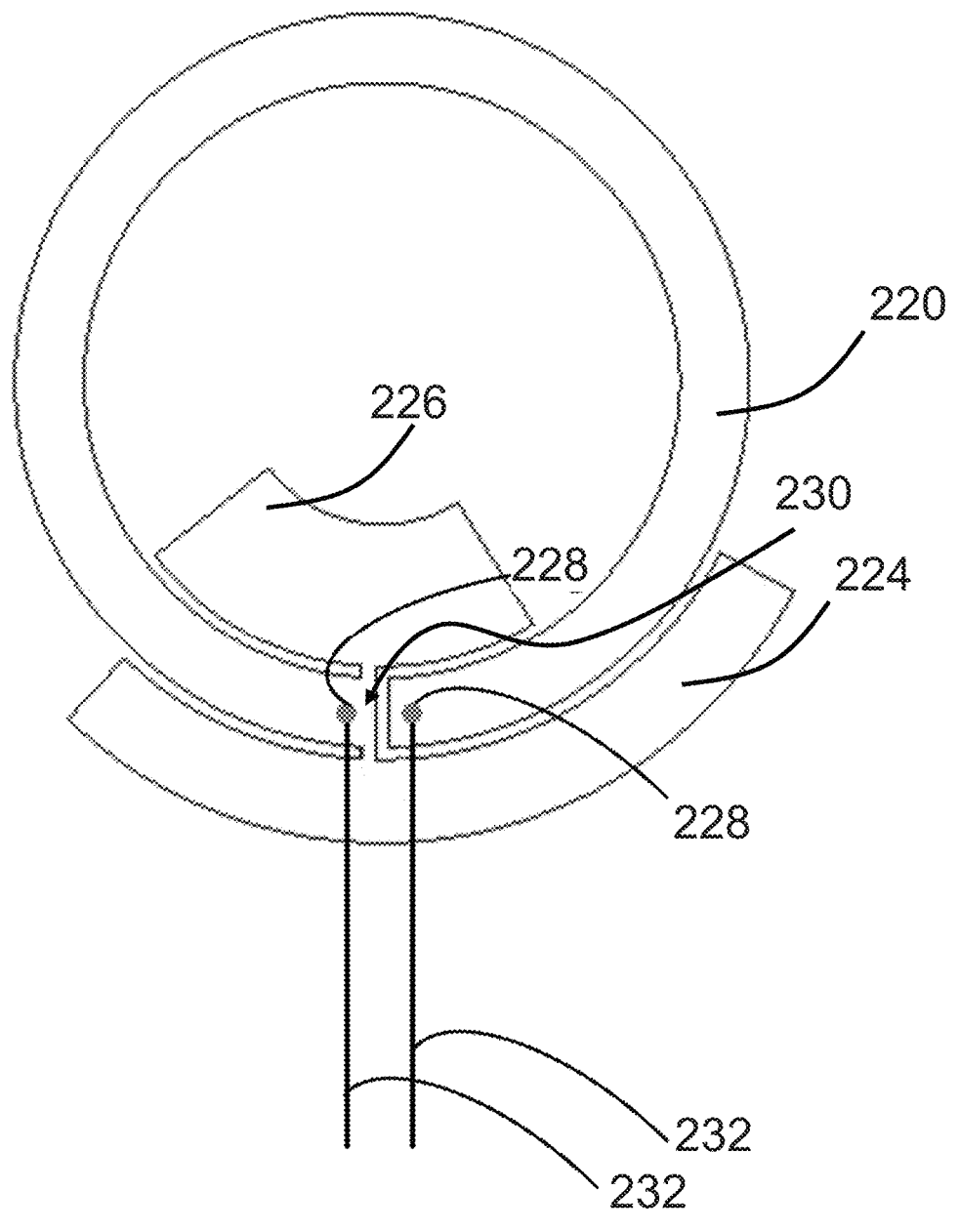
FIG. 5 is a perspective view of a loop antenna according to a third embodiment of the invention.

FIG. 5 shows a loop antenna according to another embodiment of the invention, which may be connected to the circuitry of a mobile electronic device (not shown). The structure and components of the loop antenna are generally similar to those in FIG. 1, and they will not be described again for the sake of brevity. Rather, only differences between the loop antenna in FIG. 5 compared to that in FIG. 1 will be described. In particular, for the loop antenna in FIG. 5, the connecting line 230 does not connect to the middle point of the first eCCE 224 and the middle point of the second eCCE 226. Instead, the location of connection between the first eCCE 224 and the connecting line 230 is off-center of the first eCCE 224 along its length direction. Similarly, the location of connection between the second eCCE 226 and the connecting line 230 is off-center of the second eCCE 226 along its length direction. In addition, the width of the second eCCE 226 is significantly larger than that of the loop portion 200 or the first eCCE 224. Lastly, two feedlines 232 are shown to be connected to the feeding terminals 228 on the two ends of the loop portion 200. In addition, one can see that the left portions of the first eCCE 224 and the second eCCE 226 (as delimited generally by the connecting line 230) are not equal in length. Likewise, the right portions of the first eCCE 224 and the second eCCE 226 are also not equal in length. Also, the connecting line 230 is not connected to the second eCCE 226 at a middle point thereof, and the connecting line 230 is not connected to the first eCCE 224 at a middle point thereof.

The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

For example, in the embodiments of FIGS. 1, 4 and 5, two eCCEs are in the same plane as the loop portion, and their respective surfaces are flush with each other. However, in variations of the embodiments the eCCE(s) may be vertical to the loop portion, or from any other angle with the loop portion. In those cases, it is possible that not the entire eCCE can be considered as being adjacent to the loop portion, but in any event, at least the part of the eCCE near the connecting line to the loop portion is adjacent to the loop portion.

In addition, the loop antennas (and in particular their loop portions) in the exemplary embodiments mentioned above are in annular sector shapes. One should realize that the substantially circular shape is not a must, and the loop portion may also be in the form of other nearly-closed topological structures, such as being ellipse, rectangular, or rounded-rectangular curves, contour of the eyeglass lens. The term "loop" simply means the shape is nearly-closed, but it does not limits the shape to be annular.

In the embodiments of FIGS. 1, 4 and 5, there are two eCCEs configured in the loop antenna. It is also possible to have more or less eCCEs in the loop antenna in other variations of the preferred embodiments.

It is noteworthy that in the exemplary embodiments above there are described single antenna, or single element for an antenna array or multiple input multiple output (MIMO). However, antenna arrays or MIMO antennas that duplicate the single loop antenna are still within the scope of the invention. For example, the loop portion in FIG. 1 can be modified to have more than one gap, and additional eCCEs can be configured near the additional gap to build an additional antenna element.

What is claimed is:

1. A loop antenna, comprising:
   a) a loop portion that extends along a virtual closed shape; the loop portion being opened-ended and having two ends that are separated by a gap;
   b) a first equivalent capacitive coupling element (eCCE) that is at least partially adjacent to the gap;
   wherein the first eCCE is connected to the loop portion near the gap;
   wherein, at each of the two ends of the loop portion, a feeding terminal is configured to feed the loop antenna.

2. The loop antenna according to claim 1, wherein both the loop portion and the first eCCE are electrically conductive strips and have surfaces; the surfaces of the loop portion and the first eCCE being parallel to each other.

3. The loop antenna according to claim 2, wherein the surfaces of the loop portion and the first eCCE are located substantially in a same virtual plane as the virtual closed shape.

4. The loop antenna according to claim 2, wherein the surfaces of the loop portion and the first eCCE are substantially perpendicular to a virtual plane in which the virtual closed shape is located.

5. The loop antenna according to claim 2, wherein the loop portion and the first eCCE are substantially parallel to each other along their directions of extension, such that a spacing between the first eCCE and the loop portion is substantially unchanged.

6. The loop antenna according to claim 1, wherein the virtual closed shape is a round shape;
   the loop portion having a shape of an annular sector.

7. The loop antenna according to claim 6, wherein the first eCCE is located at one of a radially inward position and a radially outward position of the loop portion.

8. The loop antenna according to claim 7, further comprises a second eCCE; wherein the second eCCE is located at the other one of the radially inward position and the radially outward position of the loop portion.

9. The loop antenna according to claim 8, wherein both the second eCCE and the first eCCE are connected to the loop portion near the gap.

10. The loop antenna according to claim 8, wherein the loop portion and the second eCCE are substantially parallel to each other along their directions of extension, such that a spacing between the second eCCE and the loop portion is substantially unchanged.

11. The loop antenna according to claim 1, further comprises a first connecting line that electrically connects the loop portion and the first eCCE; the connecting line being adjacent to the gap.

12. The loop antenna according to claim 11, wherein the first eCCE comprises a first portion and a second portion delimited by a joint of the first connecting line and the first eCCE;
   the loop antenna further comprising a second connecting line that electrically connects the loop portion and the second eCCE; the second eCCE comprising a first portion and a second portion delimited by a joint of the second connecting line and a second eCCE; the first portions of the first eCCE and the second eCCE having different lengths in their circumferential directions;; the second portions of the first eCCE and the second eCCE having different lengths in their circumferential directions.

13. The loop antenna according to claim 1, wherein one of the two ends of the loop portion is a free end that is not connected to the first eCCE.

* * * * *